United States Patent [19]
Ishida et al.

[11] Patent Number: 6,029,189
[45] Date of Patent: Feb. 22, 2000

[54] DATA TRANSFER SYSTEM

[75] Inventors: Hideo Ishida, Kobesi; Yutaka Tanaka, Osakasi, both of Japan

[73] Assignee: Matsushita Electric Industrial Co., Ltd., Japan

[21] Appl. No.: 08/986,785

[22] Filed: Dec. 8, 1997

[30] Foreign Application Priority Data

Dec. 9, 1996 [JP] Japan ................................ 8-328366

[51] Int. Cl.$^7$ .................................................. G06F 13/00
[52] U.S. Cl. ............................................ 709/105; 710/20
[58] Field of Search ................................. 709/102, 105, 709/104; 710/20; 386/125

[56] References Cited

U.S. PATENT DOCUMENTS 5,510,905   4/1996   Birk ........................................ 386/125
5,581,789   12/1996  Ueno et al. ............................... 710/20

Primary Examiner—Majid A. Banankah
Attorney, Agent, or Firm—Parkhurst & Wendel, L.L.P

[57] ABSTRACT

In a data transfer system in which when a first to fourth terminals require reading data, the data are read out of a first to fourth storages to be stored in a first and second buffer memories while a first and second virtual groups of storages are alternately switched every constant cycle, and thereafter a first and second data sending units send the data stored in the first and second buffer memories to the terminals; on the other hand, when the first to fourth terminals require writing data, received data is divided in a way to distribute the process loads of data read and data write of the divided data equally into a first and second data transfer units. At the same time, the data are stored in the first and second buffer memories of the first and second data transfer units, and thereafter the data are written into the first to fourth storages while switching the first and second virtual groups of storages alternately. As a result, the load of transferring data to the terminals is not concentrated on a particular data transfer unit in the data transfer system, even when the rate of request-to-reads from the terminals changes or differs from those of others.

5 Claims, 14 Drawing Sheets

DATA TRANSFER SYSTEM

FIELD OF THE INVENTION

This invention relates to a data transfer system which reads out data from a server such as a video server or file server and transfers the data to a client via a network, and also which writes data, which is transferred via a network from a client, to a server.

BACKGROUND OF THE INVENTION

FIG. 11 is a block diagram of a prior art data transfer system.

As will be described with reference to FIG. 11, the prior art data transfer system comprises a first disk array 150 comprising storages 110 and 120 which contain data to be transferred; a second disk array 250 comprising storages 210 and 220 which contain data to be transferred; a first data transfer unit 100 which comprises a buffer memory 170 temporarily accumulating the data to be transferred which are stored in the storages 110 and 120, a storage controller 160 reading out the data to be transferred which are stored in the storages 110 and 120 to store the read-out data to be transferred in the buffer memory 170, and a data sending unit 180 transferring the data stored in the buffer memory 170 to terminals 510, 520, 530 and 540; a second data transfer unit 200 which comprises a buffer memory 270 temporarily accumulating the data to be transferred which are stored in the storages 210 and 220, a storage controller 260 reading out the data to be transferred which are stored in the storages 210 and 220 to store the read-out data to be transferred in the buffer memory 270, and a data sending unit 280 transferring the data stored in the buffer memory 270 to terminals 510, 520, 530 and 540; a read request receiving unit 600 which receives request-to-read-datas from the terminals 510, 520, 530 and 540; a write request receiving unit 610 which receives request-to-write-datas from the terminals 510, 520, 530 and 540: a data transfer controller 700 which controls the data transfer units 100 and 200; and a network switching unit 800 which connects the data transfer units 100 and 200 to the terminals 510, 520, 530 and 540, and which connects the read request receiving unit 600 and the write request receiving unit 610 to the terminals 510, 520, 530 and 540.

In this case, the storages 110, 120, 210 and 220 each can read out "256 KB" data in a cycle; the disk arrays 150 and 250 each can read out "512 KB" data in a cycle; and the data sending units 180 and 280 each can send "512 KB" data in a cycle.

FIG. 12 is a diagram showing the data configuration of files in the prior art data transfer system.

In FIG. 12, a file A is divided into blocks each having "256 KB" size; a1 indicates the first block; a2 indicates the second block; a3 indicates the third block.

Note that files B, C and D have the same configuration as that of the file A.

For example, when the file A will be stored in the system, the block a1 is stored in the first disk array 150, and the block a2 is then stored in the second disk array 250, and the block a3 is then stored in the first disk array 150, and thereafter the remaining blocks are similarly stored alternately in the disk array 150 and in the disk array 250 one after another.

FIG. 13 is a time chart of the prior art data transfer system when the terminals 510, 520, 530 and 540 each require reading out "256 KB" data of the respective files A, B, C and D in a cycle.

Referring to FIG. 13, the processing when the terminal 510 requires reading out the data of the file A is described as follows.

(1) At period 1, the storage controller 160 of the first data transfer unit 100 reads the block a1 out of the first disk array 150 and then stores the block a1 in the buffer memory 170.

(2) At period 2, the data sending unit 180 of the first data transfer unit 100 sends the block a1, which is stored in the buffer memory 170, to the terminal 510 via the network switching unit 800. Meanwhile, the storage controller 260 of the second data transfer unit 200 reads the block a2 out of the second disk array 250 and then stores the block a2 in the buffer memory 270.

(3) At period 3, the data sending unit 280 of the second data transfer unit 200 sends the block a2, which is stored in the buffer memory 270, to the terminal 510 via the network switching unit 800. Meanwhile, the storage controller 160 of the first data transfer unit 100 reads the block a3 out of the first disk array 150 and then stores the block a3 in the buffer memory 170.

Thereafter, the remaining data of the file A are similarly processed alternately by the data transfer unit 100 and by the data transfer unit 200 every cycle according to the request-to-read-data of the terminal 510.

Note that the data of the files B, C and D are similarly processed according to the request-to-read-datas of the terminals 520 to 540.

As described above, since the data transfer units 100 and 200 each can read 512 KB data from the respective storages to send the data to the terminal in a cycle, the request-to-read-datas of only the two terminals can be processed in a cycle, but if the data transfer units 100 and 200 are switched alternately every cycle, the request-to-read-datas of the four terminals can be processed. Therefore, the request-to-read-datas of a lot of terminals can be processed when the number of the data transfer units is increased.

FIG. 15 is a time chart of the prior art data transfer system when the terminal 510 requires writing "256 KB" data of the file A in a cycle, and the terminals 520, 530 and 540 each require reading out "256 KB" data of the respective files B, C and D in the cycle.

Referring to FIG. 15, the processing when the terminal 510 requires writing the data of the file A is described as follows.

(1) At period 2, the write request receiving unit 610 receives request-to-write for the data, the block a1, from the terminal 510, and then stores the block a1 in the buffer memory 170 of the first data transfer unit 100.

(2) At period 3, the storage controller 160 of the first data transfer unit 100 writes the block a1, which is stored in the buffer memory 170, into the first disk array 150. Meanwhile, the write request receiving unit 610 receives request-to-write for the data, the block a2, from the terminal 510, and then stores the block a2 in the buffer memory 270 of the second data transfer unit 200.

(3) At period 4, the storage controller 260 of the second data transfer unit 200 writes the block a2, which is stored in the buffer memory 270, into the second disk array 250. Meanwhile, the write request receiving unit 610 receives request-to-write for the data, the block a3, from the terminal 510, and then stores the block a3 in the buffer memory 170 of the first data transfer unit 100.

Thereafter, the remaining data of the file A are similarly processed alternately by the data transfer unit 100 and by the data transfer unit 200 every cycle, responding to the request-to-write of the terminal 510.

As described above, the prior art data transfer system includes a plurality of data transfer units and assigns alternately request-to-read or request-to-write to the data transfer units every cycle in order to read out data and write data according to the requests of a lot of terminals. This prior art data transfer system is disclosed by Japanese Patent Published Application No. Hei 7-64733 (1995).

In the above-described prior art data transfer system, when a terminal has the variable rate of request-to-read or request-to-write, or terminals have different processing rates, the load (usage ratio) of the data sending process is adversely concentrated on a particular data transfer unit beyond its performance, or the load (usage ratio) of read or write process is adversely concentrated on a disk array beyond its performance.

The details of the above-mentioned problems are described as follows, referring to FIG. 14 and FIG. 16.

FIG. 14 is a time chart of the prior art data transfer system when the terminal 510 has the rate of the request-to-read-data of the file A different from those of other terminals.

While the terminals 520 to 540 each require reading "256 KB" data in a cycle, only the terminal 510 requires reading, for example, "200 KB" data in a cycle in order to perform the slow reproduction process.

(1) At period 2, the terminal 510 requires reading first "200 KB" data of the file A which corresponds to the first half of the block a1. Thereafter, the data sending unit 180 of the first dated transfer unit 100 sends the "200 KB" data corresponding to the first half of the block a1 to the terminal 510, and then sends the block b1 to the terminal 520. In this case, the amount of the send data accounts for "200 KB+256 KB=456 KB", which can be sent during the period 2. Meanwhile, the data sending unit 280 of the second data transfer unit 200 sends the block c1 to the terminal 530, and then sends the block d1 to the terminal 540. In this case, the amount of the send data accounts for "256 KB×2=512 KB", which can be sent during the period 2.

(2) At period 3, the terminal 510 requires reading the next "200 KB" of the file A, namely "56 KB" corresponding to the latter half of the block a1 and "144 KB" corresponding to the first half of the block a2. Thereafter, the data sending unit 180 of the first data transfer unit 100 sends the "56 KB" corresponding to the latter half of the block a1 to the terminal 510, and then sends the block c2 to the terminal 530, and then sends the block d2 to the terminal 540. In this case, the amount of the send data accounts for "56 KB+256 KB×2=568 KB", which exceeds "512 KB" which is the size of the data which can be sent in a cycle, so that the entire data can not be sent during the period 3. Meanwhile, the data sending unit 280 of the second data transfer unit 200 sends "144 KB" corresponding to the first half of the block a2 to the terminal 510, and then sends the block b2 to the terminal 520. In this case, the amount of the send data accounts for "144 KB+256 KB–400KB", which can be sent during the period 3.

As described above, when the rate of the requcrt-to-read-data of the terminal 510 is different from those of the other terminals, the load of sending data to the terminals 510, 530 and 540 is concentrated on the data sending unit 180 of the first data transfer unit 100, so that the load can not be completely processed in a cycle at the period 3.

Further, FIG. 16 is a time chart of the prior art data transfer system when the rate of the request-to-write-data of the terminal 510 for the file A is different from those of the other terminals.

While the terminals 520 to 540 each require reading "256 KB" data in a cycle, the terminal 510 requires writing "200 KB" data in a cycle.

(1) At period 2, the terminal 510 requires writing the first "200 KB" data or the file A which corresponds to the first half of block a1. Thereafter, the write request receiving unit 610 receives the request-to-write for the "200 KB" data corresponding to the first half of the block a1 from the terminal 510, and then stores the data in the buffer memory 170 of the first data transfer unit 100.

(2) At period 3, the terminal 510 requires writing The next "200 KB" of the file A, namely "56 KB" corresponding to the latter half of the block a1 and "144 KB" corresponding to the first half of block a2. Thereafter, the write request receiving unit 610 receives the request-to-write for the "56 KB" data corresponding to the latter half of the block a1 and the "144 KB" data corresponding to the first half of the block a2, and then stores the "56 KB" data corresponding to the latter half of the block a1 in the buffer memory 170 of the first data transfer unit 100, and then stores the "144 KB" data corresponding to the first half of the block a2 in the buffer memory 270 of the second data transfer unit 200.

(3) At period 4, the block a1 is stored in the buffer memory 170 of the first data transfer unit 100 by the period 3, so that the storage controller 160 of the first data transfer uiit 100 writes the block a1, which is stored in the buffer memory 170, to the first disk array 150. Meanwhile, the storage controller 160 of the first data transfer unit 100 reads the block c4 and the block d4 out of the first disk array 150 in response to the request-to leads of the terminals 530 and 540. In this case, the amount of both the read data and the write date accounts for "256 KB×3=768KB", which exceeds "512 BK" which is the size of the data which can be read out and written in the first disk array 150 in a cycle, so that the processes of reading out and writing the data to the first disk array 150 can not be completed during the period 4.

As described above, when the rate of the request-to-write-data of the terminal 510 is different from those of the other terminals, the load of data read and data write of the terminals 510, 530 and 540 to the first disk array 150 is concentrated on the first data transfer unit 100, so that the load can not be completely processed in a cycle at the period 4.

SUMMARY OF THE INVENTION

An object of this invention is to provide a data transfer system in which the load of transferring data to terminals is not concentrated on a particular data transfer unit, even when the rate of request-to-read-data of a terminal changes or differs from those of others.

Other objects and advantages of this invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of this invention, a data transfer system comprises a plurality of data transfer paths comprising a group of storages including a plurality of storages for storing data, an accumulating unit for temporarily accumulating the data to be transferred which are stored in the storages, a storing unit for reading out the data to be transferred stored in the storages to store the data to be transferred in the accumulating unit, and a transferring unit for transferring the data to be transferred stored in the accumulating unit to terminals, thereby dividing a file into a plurality of blocks having a given size to distribute the blocks into the plural storages on the different data transfer paths for storing the blocks, and receiving request-to-reads from the terminals connected to ends of the data transfer paths by read request receiving units to properly read the data out of the storages and thereafter to transfer the data into the terminals; a plurality of virtual groups of storages comprising storages which are those selected from the storages on the different data transfer paths; and a data transfer controller for, at the first period, reading the distributed data, which are stored in a given virtual group of storages among the plural virtual groups of storages, from the storages on the plural data transfer paths all at once, to store the read data in the accumulating unit, and then at the second period, reading the distributed data, which are stored in a virtual group of storages different from the given virtual group of storages, from the storages on the plural data transfer paths all at once, to store the read data in the accumulating unit, and thus successively changing the virtual groups of storages to read data therefrom by alternating the first period and the second period. As a result, the load of sending data more than can be processed is not concentrated on any of the data transfer units on the data transfer paths, even when the request-to-read-datas of the terminals have different rate, because the data to be transferred into a terminal in a cycle is distributed to the data transfer units.

According to a second aspect of this invention, the data transfer system of the first aspect includes a write request receiving unit for receiving data of a request-to-write from a terminal to divide the received data into a plurality of data blocks the number of which corresponds to the number of the plural data transfer paths and then to write the divided data into the storages constituting the virtual group of storages, the write request receiving unit, at first period, writing data into storages constituting a given virtual group of storages among the plural virtual groups of storages, and then at second period, writing data into storages constituting a virtual group of storages different from the given virtual group of storages; and which includes a data write changing unit for successively changing the virtual groups of storages to write data therein by alternating the first period and the second period. As a result, the load of data write and data read more than can be processed is not concentrated on the disk of any of the data transfer units, even when the request to-write-datas of the terminals have different rates, because the data which a terminal requires writing in a cycle is divided to be stored in the accumulating units, and the storing unit writes the divided data into the disks.

According to a third aspect of this invention, the data transfer system of the second aspect includes a plurality of the write request receiving units and the data transfer controller including a designating unit for designating, in advance, which of the plural write request receiving units receives and processes data of request-to-writes from which terminal. As a result, the request-to-writes of plural terminals can be processed while the load of data write and data read more than can be processed is not concentrated on the disk of any of the data transfer units, because the request-to-writes of the terminals are distributed on the respective write request receiving units to be processed.

According to a fourth aspect, the data transfer system of the second aspect includes a plurality of the write request receiving units and a write request controller for receiving request-to-write-datas from the terminals to calculate the load rates of processing request-to-write-datas which are being processed by the respective write request receiving units, and then according to the calculated result, tansferring the request-to-write to the write request receiving unit having the lowest load rate. As a result, such a case is prevented that the process is concentrated on either write request receiving unit, though the other write request receiving unit has the spare capacity for processing and therefore that the request-to-writes from the terminals can not be processed, because the write request controller can transfer request-to-writes to the write request receiving units in a way to distribute the request-to-writes equally to each write request receiving unit.

According to a fifth aspect of this invention, the data transfer system of the first aspect includes a write request controller for receiving request-to-write-data from a terminal to divide the received request-to-write-data into a plurality of request-to-write-datas the number of which corresponds to the number of the data transfer paths, and then transferring the divided request-to-write-datas to the respective data transfer paths, and includes a received data storing unit, which is set up on the respective data transfer paths, for receiving the request-to write-datas transferred from the write request controller to store the received data in the accumulating unit. As a result, the write request controller can convert the request-to-write from a terminal into request-to-writes to the respective data transfer units to be sent to the respective data transfer units. Therefore, the processing of the request-to-write is distributed into the data transfer units, so that the load of data write and data read more than can be processed is not concentrated on the disk of any of the data transfer units.

DETAILED DESCRIPTION OF THE PREFERRED EMBODIMENTS

[Embodiment 1]

Figure 1:
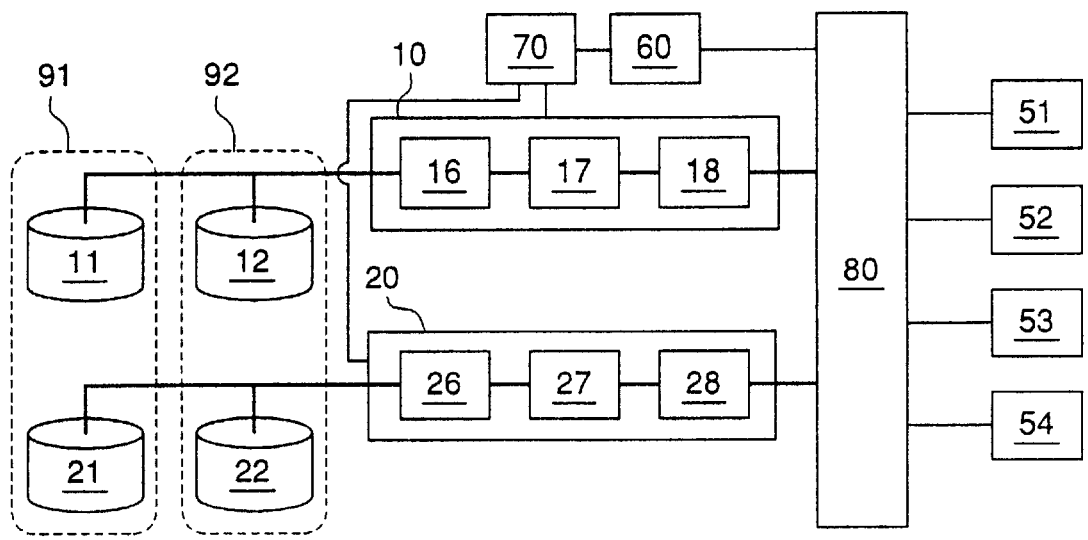
FIG. 1 is a block diagram of a data transfer system according to a first embodiment of this invention.

FIG. 1 is a block diagram of a data transfer system according to a first embodiment of this invention.

In FIG. 1, the data transfer system according to the first embodiment of this invention comprises a first virtual group of storages 91 comprising storages 11 and 21 which contain data to be transferred; a second virtual group of storages 92 comprising storages 12 and 22 which contain data to be transferred; a first data transferring unit 10 comprising a buffer memory 17 for temporarily accumulating data to be transferred which are stored in the storages 11 and 12, a storage controller 16 for reading out data to be transferred which are stored in the storages 11 and 12 to store the read data to be transferred in the buffer memory 17, and a data sending unit 18 for transferring the data stored in the buffer memory 17 to terminals 51, 52, 53 and 54; a second data transferring unit 20 comprising a buffer memory 27 for temporarily accumulating data to be transferred which are stored in the storages 21 and 22, a storage controller 26 for Leading out data to be transferred which are stored in the storages 21 and 22 to store the read data Lo be transferred in the buffer memory 27, and a data sending unit 28 for transferring the data stored in the buffer memory 27 to the terminals 51, 52, 53 and 54; a read request receiving unit 60 for receiving request-to-read-datas from the terminals 51, 52, 53 and 54; a data transfer controller 70 for controlling the data transfer units 10 and 20; and a network switching unit 80 for connecting the data transfer units 10 and 20 to the terminals 51, 52, 53 and 54, and the read request receiving unit 60 to the terminals 51, 52, 53 and 54.

In this case, it is assumed that the storages 11, 12, 21 and 22 each can read out 256 KB data in a cycle, and that the virtual groups of storage 21 and 22 each can read out 512 KB data in a cycle and that the data sending units 18 and 28 each can send 512 KB data in a cycle.

Figure 2:
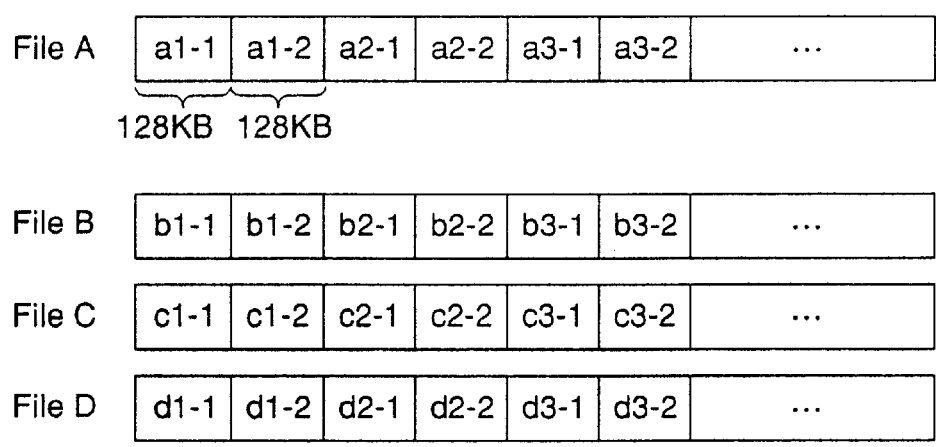
FIG. 2 is a diagram showing the data configuration of files in the data transfer system.

FIG. 2 is a diagram showing the data configurations of files in the data transfer system.

As will be observed from FIG. 2, a file A is divided into blocks each size of which is 256 KB; a1 indicates the first block; a2 indicates the second block; a3 indicates the 3rd block; further, the block a1 is divided into two 128 KB size of blocks a1-1 and a1-2; the block a2 is divided into two 128 KB size of blocks a2-1 and a2-2; the block a3 is divided into two 128 KB size of blocks a3-1 and a3-2.

Note that files B, C and D have the same configurations as that of the file A.

For example, when the file A will be stored in the data transfer system, the block a1 is stored in the first virtual group of storages 91; the block a2 is stored in the second virtual group of storages 92; the block a3 is stored in the first virtual group of storages 91; the block a4 is stored in the second virtual group of storages 92; and similarly the remaining blocks are successively stored in the virtual groups of storages 91 and 92.

In this case, when the block a1 is stored in the first virtual group of storages 91, the block a1-1 is stored in the storage 11 while the block a1-2 is stored in the storage 21.

Figure 3:
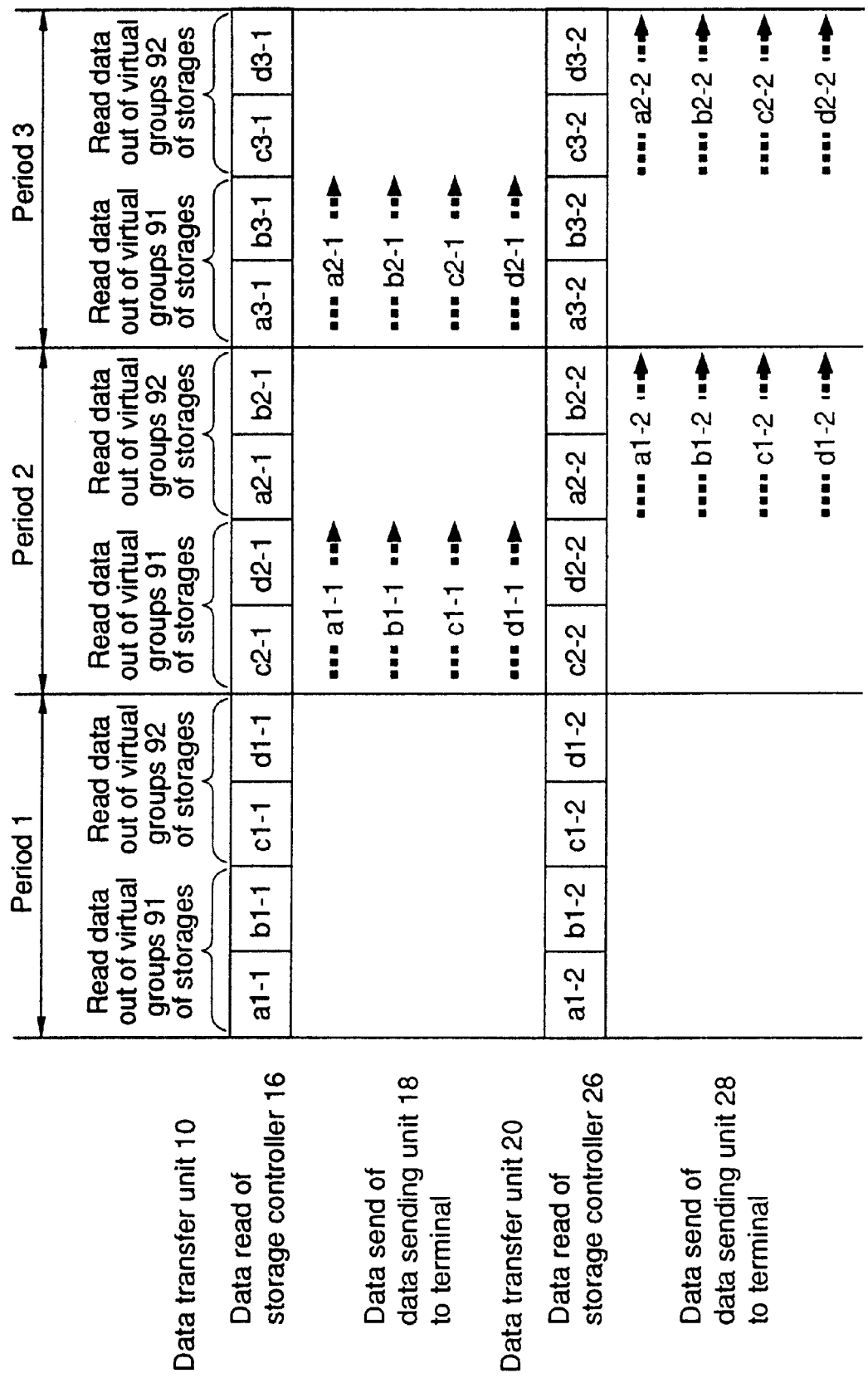
FIG. 3 is a time chart of the data transfer system when terminals 51 to 54 each require reading "256 KB" data of the respective files A, B, C, and D in a cycle.

FIG. 3 is a time chart of the data transfer system when the terminals 51 to 54 each send request-to-reads for "256 KB" data of the respective files A, B, C and D in each cycle.

With reference to FIG. 3, the processing when the terminal 51 requires reading data of the file A is described as follows.

(1) At period 1, the data transfer controller 70 controls the data transfer units 10 and 20 in a way to read out the block a1 out of the first virtual group of storages 91. Specifically, the storage controller 16 of the first data transfer unit 10 reads the block a1-1 out of the storage 11 to store the block a1-1 in the buffer memory 17; meanwhile, the storage controller 26 of the second data transfer unit 20 reads the block a1-2 out of the storage 21 to store the block a1-2 in the buffer memory 27.

(2) At period 2, the data transfer controller 70 controls the data transfer units 10 and 20 in a way to send the block a1 to the terminal 51 via the network switching unit 80. Specifically, the data sending unit 18 of the first data transfer unit 10 sends the block a1-1 stored in the buffer memory 17 to the terminal 51; meanwhile, the data sending unit 28 of the second data transfer unit 20 sends the block a1-2 stored in the buffer memory 27 to the terminal 51. Hence, the terminal 51 receives the blocks. a1-1 and a1-2, resulting in receiving the block a1. At the same time, the data transfer controller 70 controls the data transfer units 10 and 20 in a way to read the block a2 out of the second virtual group of storages 92.

(3) At period 3, the data transfer controller 70 controls the data transfer units 10 and 20 in a way to send the block a2 to the terminal 51. Meanwhile, the data transfer controller 70 controls the data transfer units 10 and 20 in a way to read the block a3 out of the first virtual group of storages 91.

Thereafter, the data transfer units 10 and 20 read out the remaining data of the file A alternately from the virtual groups of storages 91 and 92 every cycle.

Note that the data of the files B, C and D are similarly processed according to the request-to-read-datas of the terminals 52 to 54.

As described above, in the first embodiment, the data transfer units 10 and 20 each send "128 KB" data in response to the request-to-read for "256 KB" data from a terminal in a cycle. That is, the data transfer units 10 and 20 each can send "512 KB" data in a cycle. As a result, the data transfer system can process the request-to-read-datas from four terminals.

Figure 4:
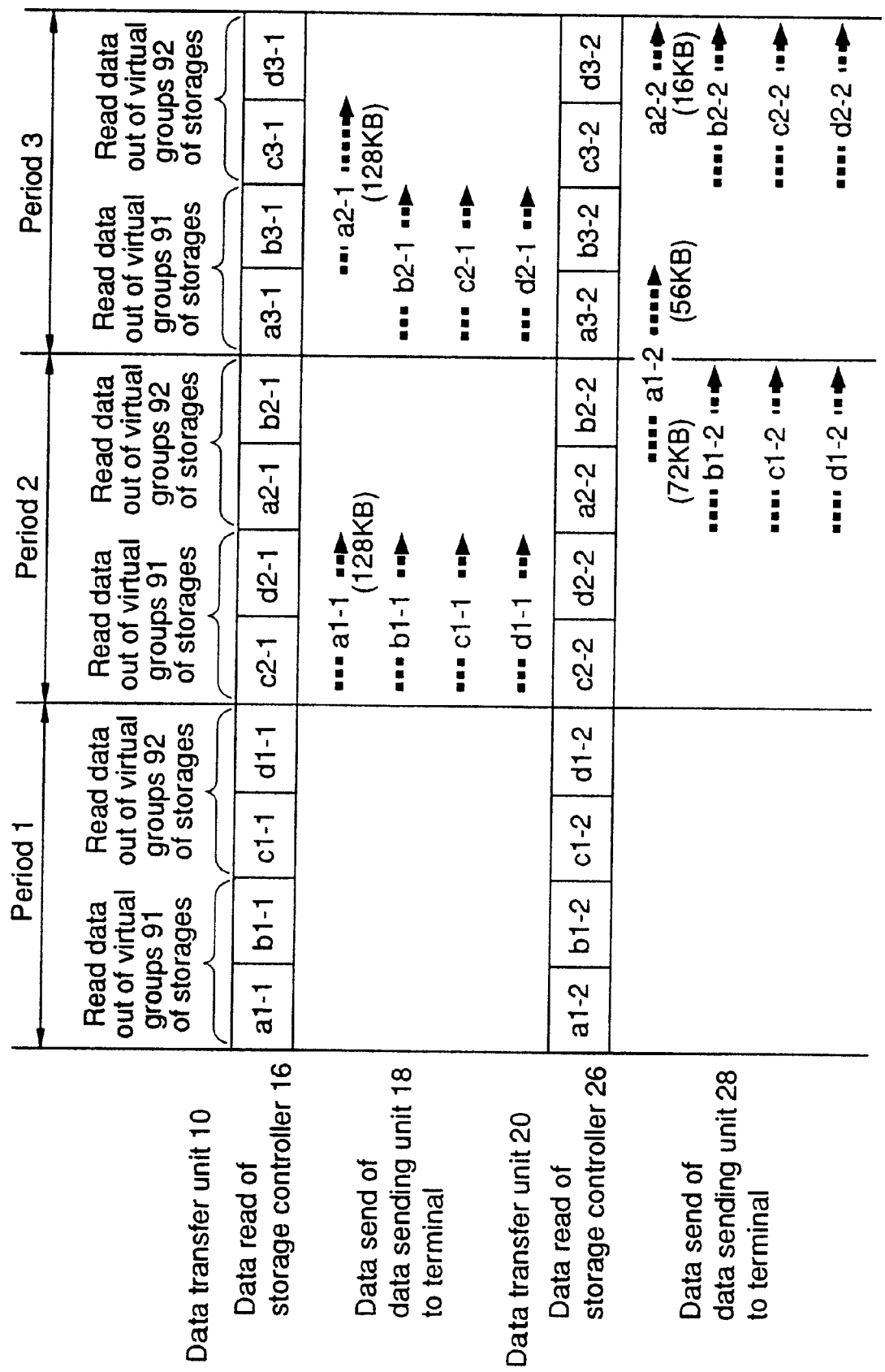
FIG. 4 is a time chart of the data transfer system when the request-to-read-data of the terminal 51 for the file A has a different rate.

FIG. 4 is a time chart of the data transfer system when the terminal 51 has the rate of the request-to-read-data of the file A different from those of the other terminals.

Referring to FIG. 4, the process when the terminal 51 has the rate of the request-to-read-data of the file A different from those of the other terminals is described as follows.

It is assumed that while the terminals 52 to 54 each require reading "256 KB" data in a cycle, only the terminal 51 requires reading "200 KB" data in a cycle.

(1) At period 2, the terminal 51 requires reading the first "200 KB" data of the file A, namely the block a1-1 having "128 KB" size and "72 KB" corresponding to the first half of the block a1-2. Also, the data sending unit 18 of the first data transfer unit 10 sends the blocks a1-1, b1-1, c1-1 and d1-1 to the terminals 51 to 54, respectively. In this case, the amount of the send data accounts for "128 KB×4=512 KB", which can be sent during the period 2. Meanwhile, the data sending unit 28 of the second data transfer unit 20 sends "72 KB" corresponding to the first half of the block a1-2 and the blocks b1-2, c1-2 and d1-2 to the terminals 51 to 54, respectively. In this case, the amount of the send data accounts for "72 KB+128 KB×3=456 KB", which can be sent during the period 2.

(3) At period 3, the terminal 51 requires reading the next "200 KB" data of the file A, namely "56 KB" corresponding to the latter half of the block a1-2 and "128 KB" of the block a2-1 and "16 KB" corresponding to the first half of the block a2-2. Also the data sending unit 18 of the first data transfer unit 10 sends the blocks a2-1, b2-1, c2-1 and d2-1 to the terminals 51 to 54, respectively. In this case, the amount of the send data accounts for "128 KB×4=512 KB", which can be sent during the period 3. Meanwhile, the data sending unit 28 of the second data transfer unit 20 sends "56 KB" corresponding to the latter half of the blocks a1-2, "16 KB" corresponding to the first half of the block a2-2, and the blocks b2-2, c2-2 and d2-2 to the terminals 51 to 54, respectively. In this case, the amount of the send data accounts for "56 KB+16 KB+128 KB×3=456 KB", which can be sent during the period 3.

As described above, in the first embodiment, even when the terminal 51 has the rate of request-to-read-data different from those of the other terminals, the data to be transferred to the terminal 51 in a cycle are distributed in the data transfer units 10 and 20. As a result, there is no case that the load of data sending process is concentrated on either of the data sending units 18 and 19 of the data transfer units 10 and 20.

[Embodiment 2]

Figure 5:
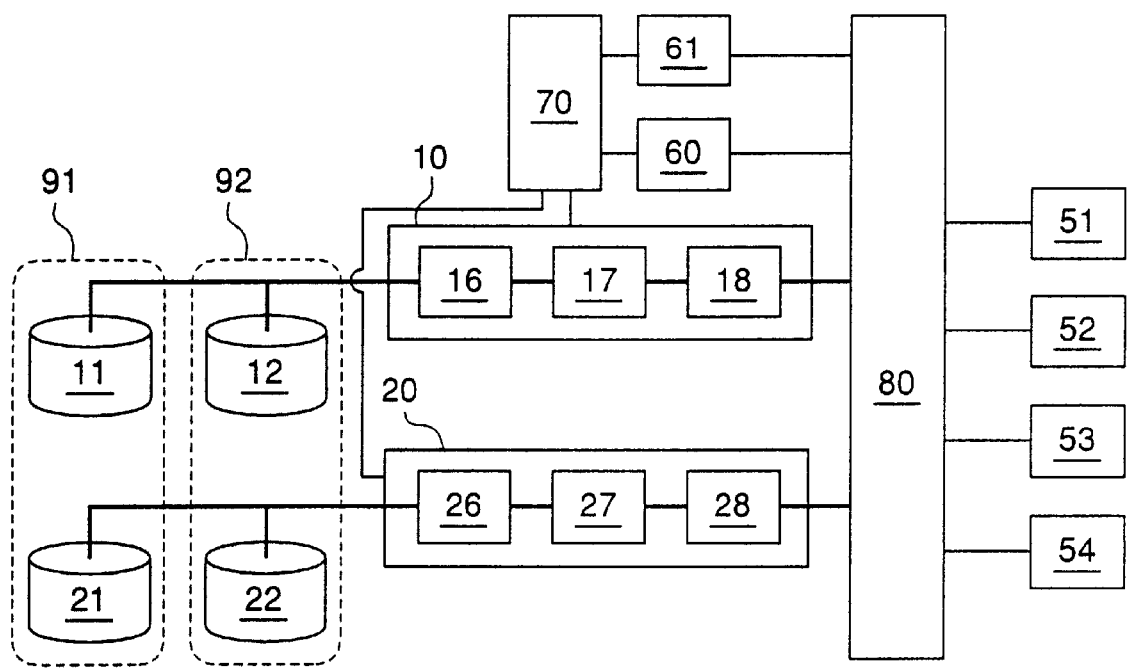
FIG. 5 is a block diagram of a data transfer system according to a second embodiment of this invention.

FIG. 5 is a block diagram of a data transfer system according to a second embodiment of this invention.

In FIG. 5, the features of the data transfer system according to the second embodiment of this invention are the following points; that the data transfer system includes a write request receiving unit 61 for receiving data of request-to-write from the terminals 51 to 54 to divide the received data into data blocks the number of which corresponds to the number of data transfer units 10 and 20, and thereafter writing the received data to the buffer memories 17 and 27 of tho respective data transfer units 10 and 20; and that the data transfer controller 70 controls the storage controllers 16 and 26 of the respective data transfer units 10 and 20 in a way that the storage controller units 16 and 26 write the data to be transferred, which are stored in the buffer memories 17 and 27, to the storages 11, 12, 21 and 22 in every a specified cycle. The other configuration is the same as that according to the first embodiment.

Figure 6:
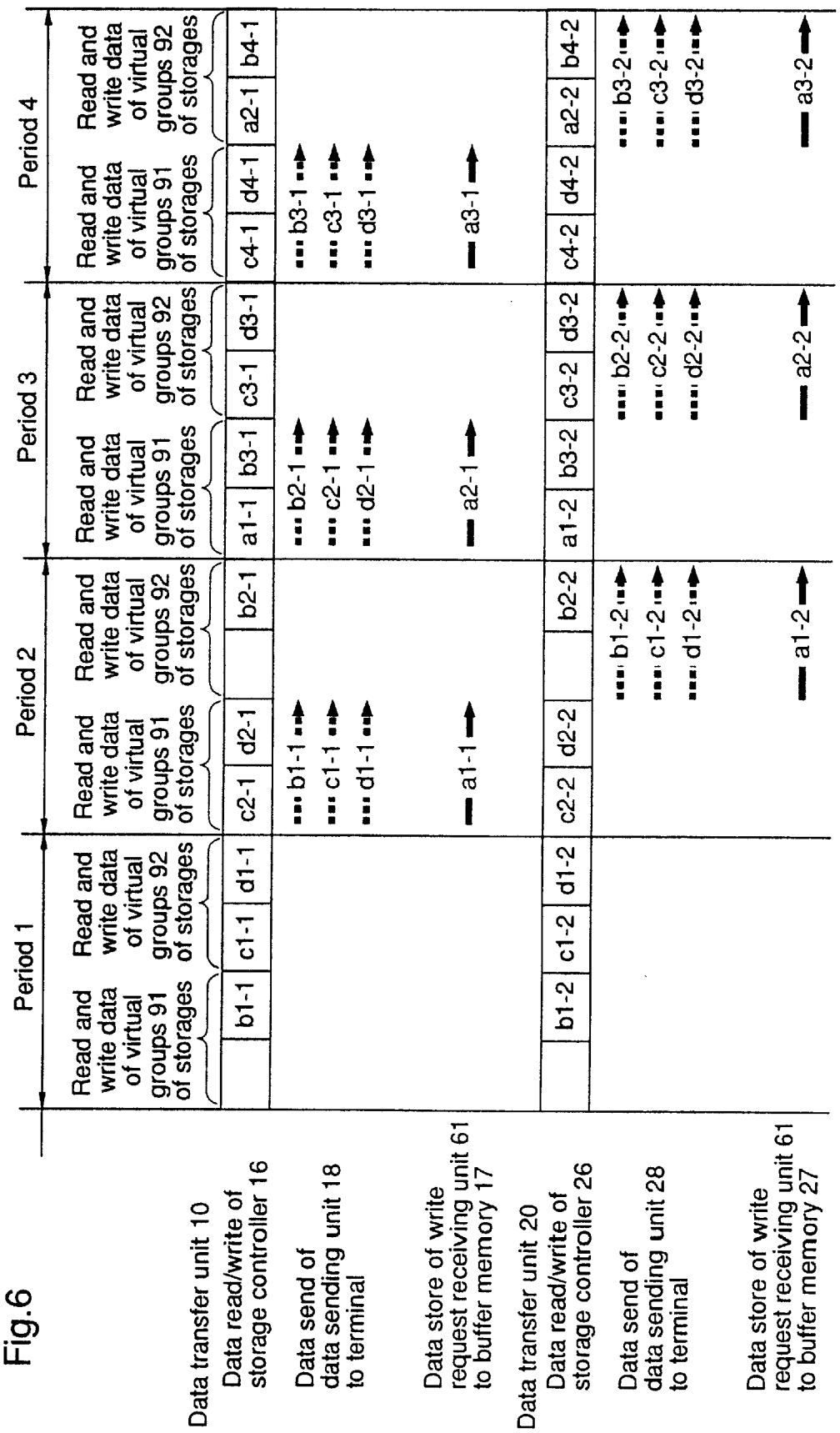
FIG. 6 is a time chart of the data transfer system when the terminal 51 requires writing "256 KB" data of the file A while the terminals 52 to 54 each require reading "256 KB" data of the respective files B, C and D in a cycle.

FIG. 6 is a time chart of the data transfer system when the terminal 51 sends request-to-write for "256 KB" data of the file A in each cycle, and the terminals 52 to 54 each send request-to-reads for "256 KB" data of the respective files B, C and D in each cycle.

With reference to FIG. 6, the processing when the terminal 51 requires writing data of the file A is described as follows.

(1) At period 2, the write request receiving unit 61 receives request-to-write-data for the block a1 from the terminal 51, and thereafter stores block a1-1, which is the first half of the block a1, to the buffer memory 17 of the first data transfer unit 10, and then stores block a1-2, which is the latter half of the block a1, to the buffer memory 27 of the second data transfer unit 20.

(2) At period 3, the data transfer controller 70 controls the data transfer units 10 and 20 in a way that the data transfer units 10 and 20 write the block a1 to the first virtual group 91 of storages. Specifically, the storage controller 16 of the first data transfer unit 10 writes the block a1-1, which is stored in the buffer memory 17, to the storage 11, while the storage controller 26 of the second data transfer unit 20 writes the block a1-2, which is stored in the buffer memory 27, to the storage 21. At the same time, the write request receiving unit 61 receives the request-to-write-data for the block a2 from the terminal 51, and thereafter stores the block a2-1 in the buffer memory 17 of the data transfer unit 10, and then stores the block a2-2 in the buffer memory 27 of the second data transfer unit 20.

(3) At period 4, the data transfer controller 70 controls the data transfer units 10 and 20 in a way that the data transfer units 10 and 20 write the block a2 to the second virtual group 92 of storages. At the same time, the write request receiving unit 61 receives the request-to-write-data for the block a3 from the terminal 51, and thereafter stores the block a3-1 in the buffer memory 17 of the first data transfer unit 10, and then stores the block a3-2 in the buffer memory 27 of the second data transfer unit 20.

Thereafter, the data transfer units 10 and 20 write the remaining data of the file A alternately to the virtual group 91 of storages and to the virtual group 92 of storages every cycle.

Figure 7:
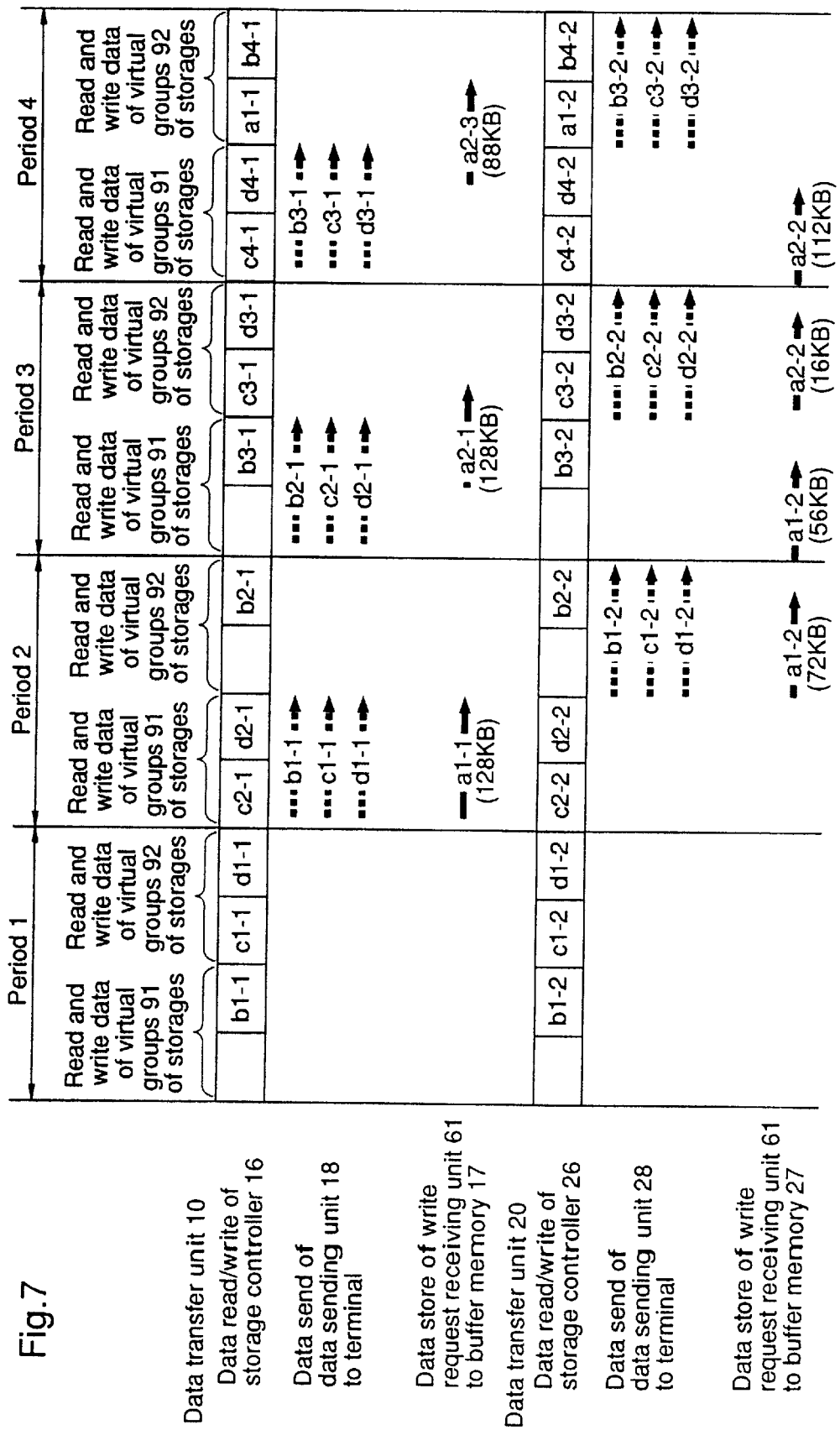
FIG. 7 is a time chart of the data transfer system when the request of the terminal 51 to write data of the file A has a different rate.

FIG. 7 is a time chart of the data transfer system when the terminal 51 has the rate of request-to-write-data for the file A different from those of the other terminals.

With reference to FIG. 7, the processing when the terminal 51 requires writing data of the file A is described as follows.

The terminals 52 to 54 each-send request-to-reads for "256 KB" data to the data transfer system in each cycle, while the terminal 51 sends request-to-read for "200 KB" data in each cycle.

(1) At period 2, the terminal 51 requires writing the first "200KB" data of the file A, namely the block a1-1 having "128 KB" size and "72 KB" corresponding to the first half of the block a1-2. Further, the write request receiving unit 61 stores the block a1-1 in the buffer memory 17 of the first data transfer unit 10, and then stores "72 KB" corresponding to the first half of the block a1-2 in the buffer memory 27 of the second data transfer unit 20.

(2) At period 3, the terminal 51 requires writing the next "200 KB" data of the file A, namely "56 KB" corresponding to the latter half of the block a1-2, "128 KB" corresponding to the block a2-1 and "16 KB" corresponding to the first half of the block a2-2. Further, the write request receiving unit 61 stores "128 KB" corresponding to the block a2-1 in the buffer memory 17 of the first data transfer unit 10, while stores "56 KB" corresponding to the latter half of the block a1-2 and "16KB" corresponding to the first half of the block a2-2 in the buffer memory 27 of the second data transfer unit 20.

(3) At period 4, since the blocks a1-1 and a1-2 of the block a1 have been stored in the buffer memories 17 and 27, respectively, by the period 3, the data transfer units 10 and 20 write the block a1 in the second virtual group 92 of storages. On the other hand, in response to request-to-read-data of the terminals 52 to 54, the data transfer units 10 and 20 read blocks c4 and d4 out of the first virtual group 91 of storages, and then read block b4 out of the second virtual group 92 of storages. In this case, the amount of the read data out of the first virtual group 91 of storages accounts for "128 KB×4=512 KB" corresponding to the blocks c4-1, c4-2, d4-1 and d4-2, which can be completely read out during the period 4. Also, the amount of the read and write data of the second virtual group 92 of storages accounts for "128 KB×4=512 KB" corresponding to the blocks a1-1, a1-2, b4-1 and b4-2, which can be completely read and written during the period 4.

As described above, in the embodiment 2 of this invention, even when the rate of request-to-write-data of the terminal 51 is different from those of the other terminals, the data which the terminal 51 requires writing during a cycle is divided to be stored in the buffer memories 17 and 27 of the data transfer units 10 and 20, and thereafter the storage controllers 16 and 26 write the divided data into the virtual groups 91 and 92 of storages. As a result, it can be avoided that the load of data write and data read more than can be processed is concentrated on either of the virtual groups 91 and 92 of storages of the data transfer units 10 and 20.

[Embodiment 3]

Figure 8:
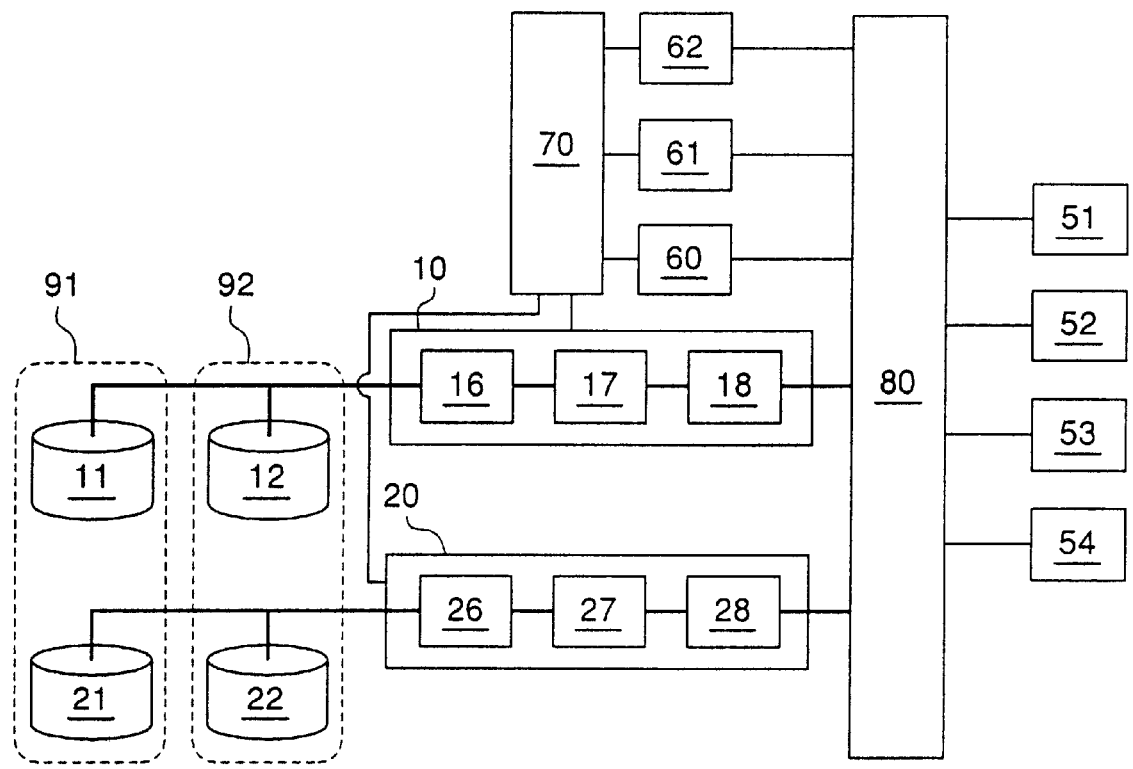
FIG. 8 is a block diagram of a data transfer system according to a third embodiment of this invention.

FIG. 8 is a block diagram of a data transfer system according to a third embodiment of this invention.

In FIG. 8, the features of the data transfer system according to the third embodiment are the following points; that the data transfer system includes two sets of write request receiving units 61 and 62; and that the data transfer controller 70 designates which of the write request receiving units 61 and 62 receives data of request-to-write from which terminal. The other configuration is the same as that according to the second embodiment.

The processing for request-to-write-data is described as follows.

It is assumed that the write request receiving units 61 and 62 each can process request-to-write for "512 KB" data in a cycle, and that the terminals 51 to 54 each require writing "256 KB" data in a cycle.

When request-to-write-data is processed, only two terminals can simultaneously send request-to-write-data to one write request receiving unit. Accordingly, the write request receiving unit 61 is assigned to process the request-to-write-datas of the terminals 51 and 52, while the write request receiving unit 62 is assigned to process the request-to-write-datas of the terminals 53 and 54. Therefore, the request-to-write-datas of tour terminals can be processed.

Specifically, the two write request receiving units 61 and 62 are set up in the third embodiment; and the data transfer controller 70 of the system designates in advance which of the write request receiving units 61 and 62 receives data of request-to-write from which terminal, whereby to distribute the request-to-writes of the terminals 51 to 54 into the write request receiving units 61 and 62 to be processed. As a result, request-to-write-datas of four terminals can be processed, while the load of data write and data read more than can be processed is not concentrated on either of the virtual groups 91 and 92 of storages of the data transfer units 10 and 20.

[Embodiment 4]

Figure 9:
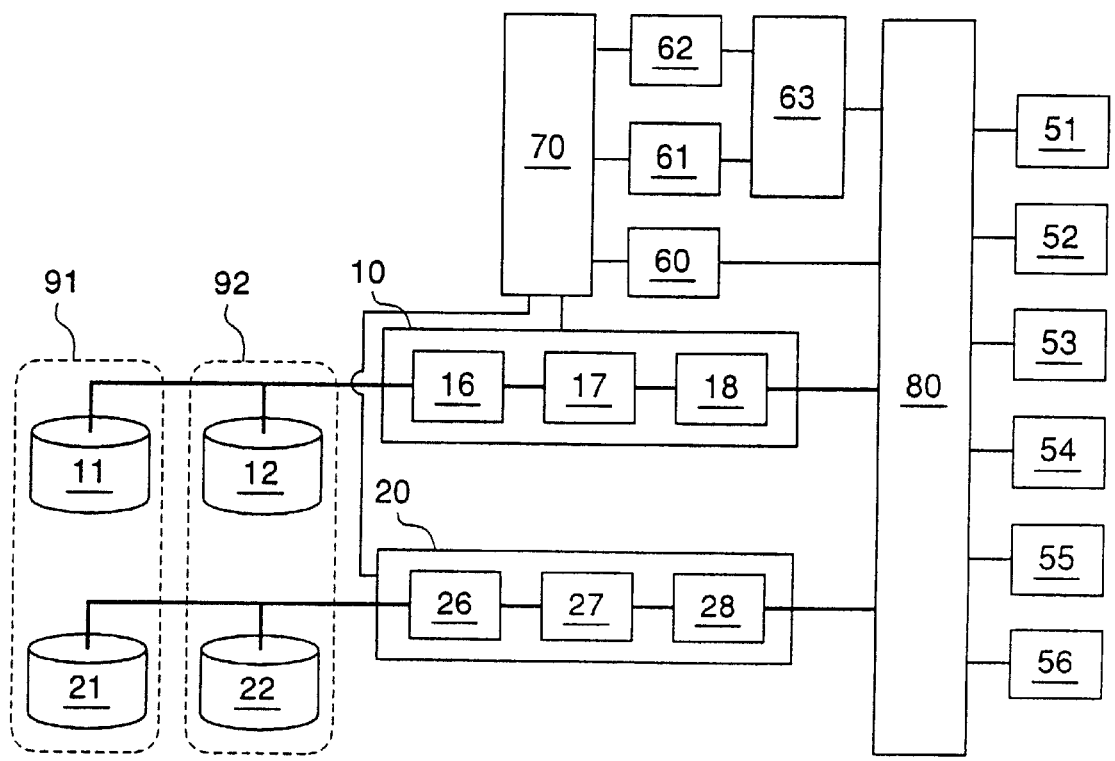
FIG. 9 is a block diagram of a data transfer system according to a fourth embodiment of this invention.

FIG. 9 is a block diagram of a data transfer system according a fourth embodiment of this invention.

Referring to FIG. 9, the features of the data transfer system according to the fourth embodiment of this invention is described as follows; two write request receiving units 61 and 62 are set up in the system; and the system includes a write request controller 63 which receives the request-to-write-datas from the terminals 51 to 56, and then calculates the load rates of processing request-to-write-datas which is being processed by the respective write request receiving units 61 and 62, and then transfers the request-to-write to the write request receiving unit which has the lowest load rate based on the result of the calculation. The other configuration is the same as that according to the second embodiment.

The processing for request-to-write-data is described as follows.

When the terminal first starts to require writing, the write request controller 63 calculates the load (rate) of the write request receiving units 61 and 62, and then transfers the request-to-write of the terminal 51 to the write request receiving unit 61, because neither the write request receiving unit 61 nor 62 processes the request-to-write.

Thereafter, when the terminal 52 starts to require writing, the write request controller 63 calculates the load (rate) of the write request receiving units 61 and 62, and then transfers the request-to-write of the terminal 52 to the write request receiving unit 62, because the write request receiving unit 61 processes the request-to-write of the terminal 51.

As described above, in the fourth embodiment, the two write request receiving units 61 and 62 are set up in the data transfer system, and the system includes the write request controller 63 which receives the request-to-write-datas from the terminals 51 to 56, and then calculates the load rates Of processing request-to-write-datas which are being processed by the write request receiving units 61 and 62, and then transfers the request-to-write to the write request receiving unit which has the lowest load rate based on the result of the calculation, whereby the request-to-writes of the terminals can be transferred by the write request receiving unit 63 to the write request receiving units 61 and 62 in a way to be distributed equally to the write request receiving units 61 and 62. As a result, such a case is prevented that the process is concentrated on either write request receiving unit, though the other write request receiving unit has the spare capacity for processing, and that the request-to-writes from the terminals can not thus be processed.

[Embodiment 5]

Figure 10:
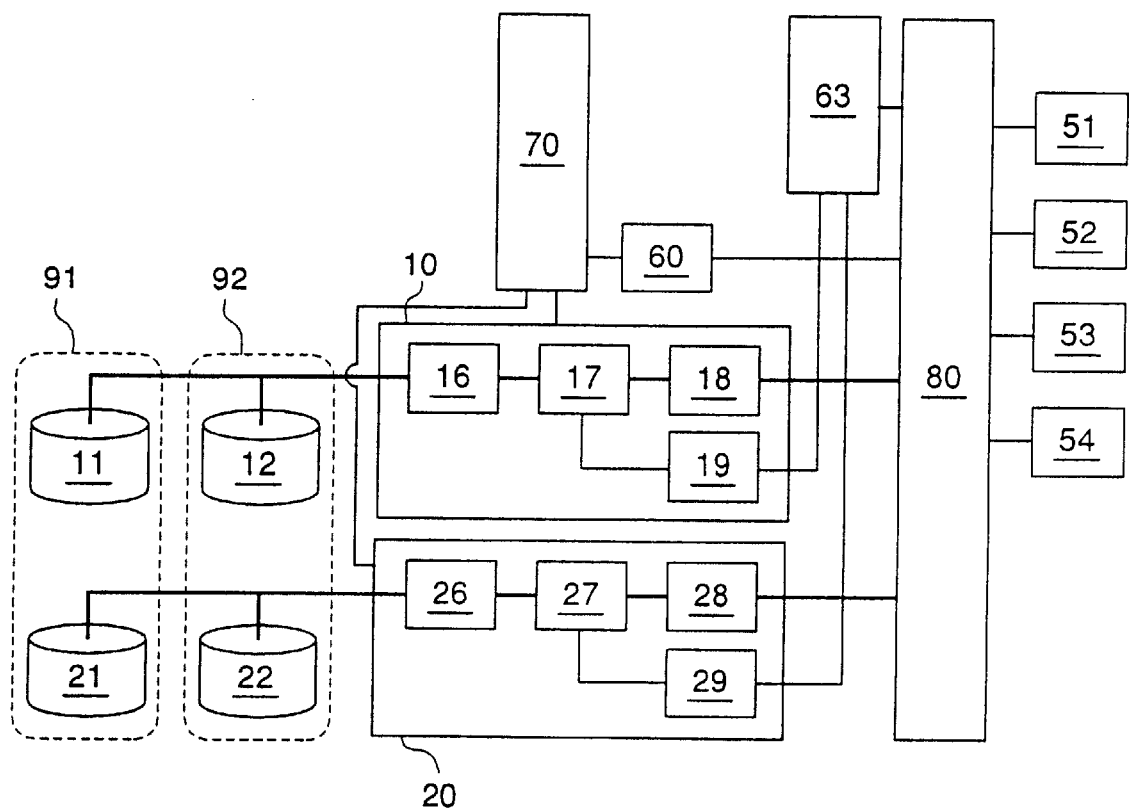
FIG. 10 is a block diagram of a data transfer system according to a fifth embodiment of this invention.
Figure 11:
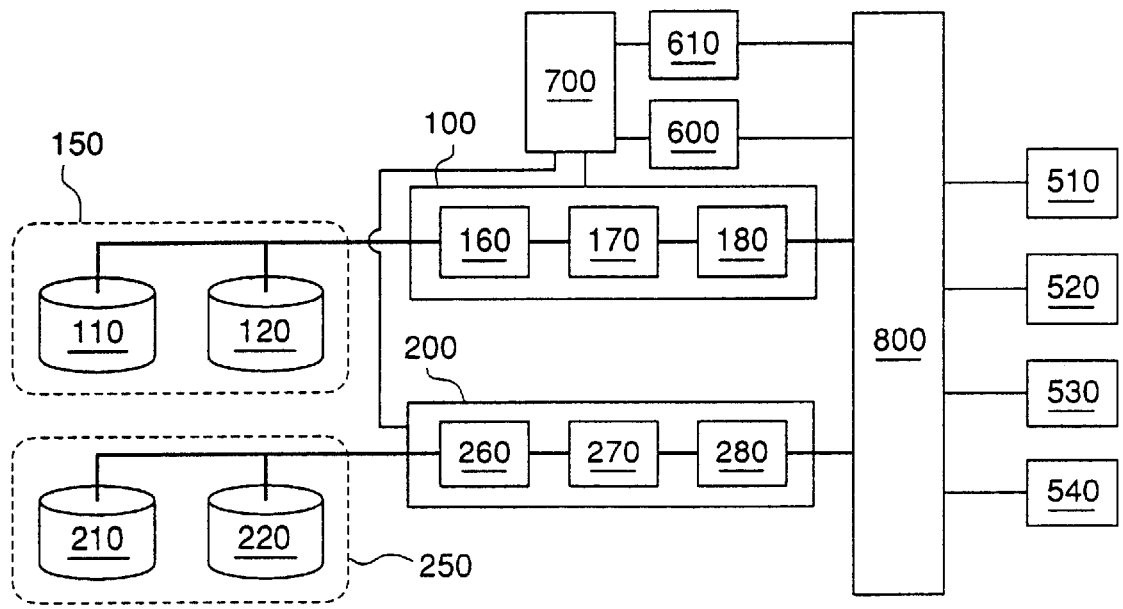
FIG. 11 is a block diagram of a prior art data transfer system.
Figure 12:
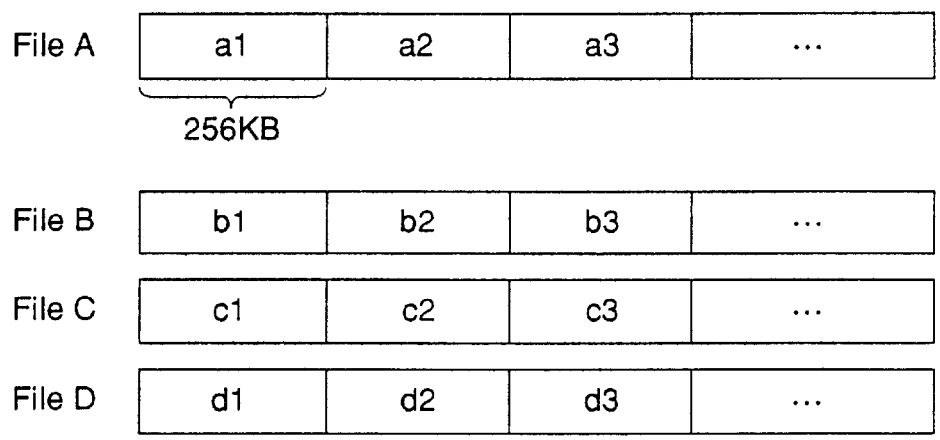
FIG. 12 is a diagram showing the data configuration of files in the prior art data transfer system.
Figure 13:
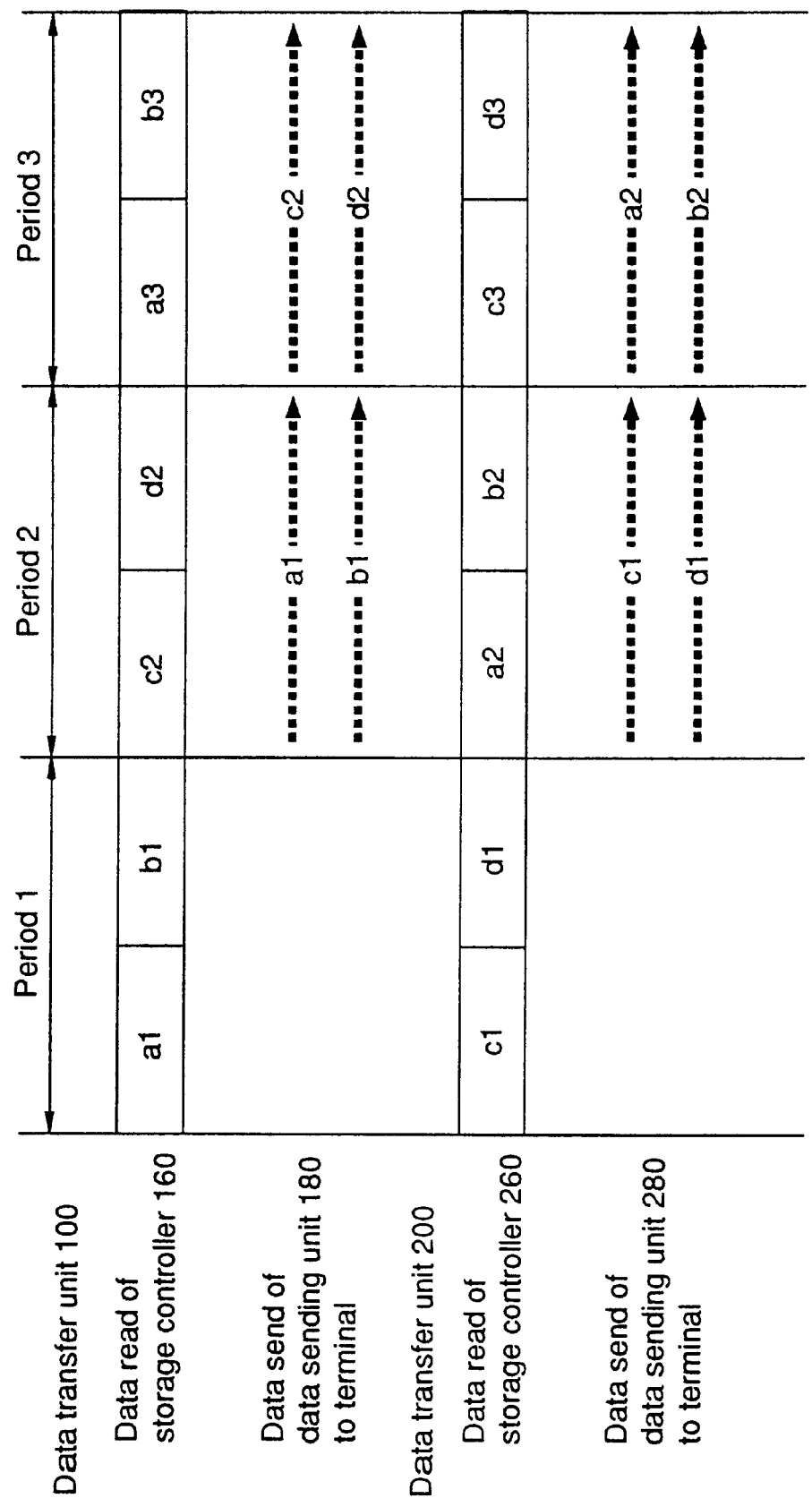
FIG. 13 is a time chart of the prior art data transfer system when terminals 510 to 540 each require reading "256 KB" data of the respective files A, B, C, and D in a cycle.
Figure 14:
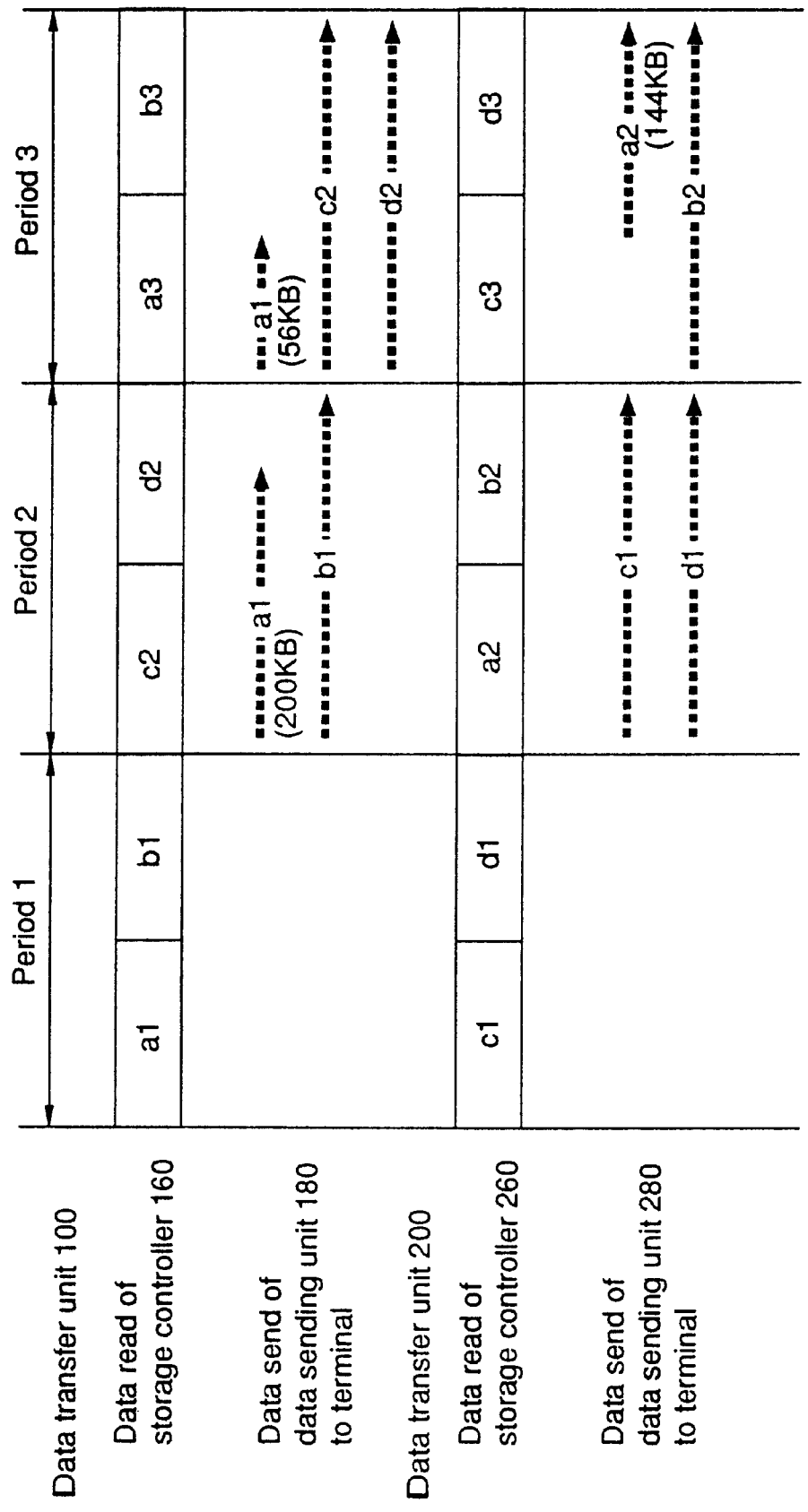
FIG. 14 is a time chart of the prior art data transfer system when the request-to-read-data of the terminal 510 for the file A has a different rate.
Figure 15:
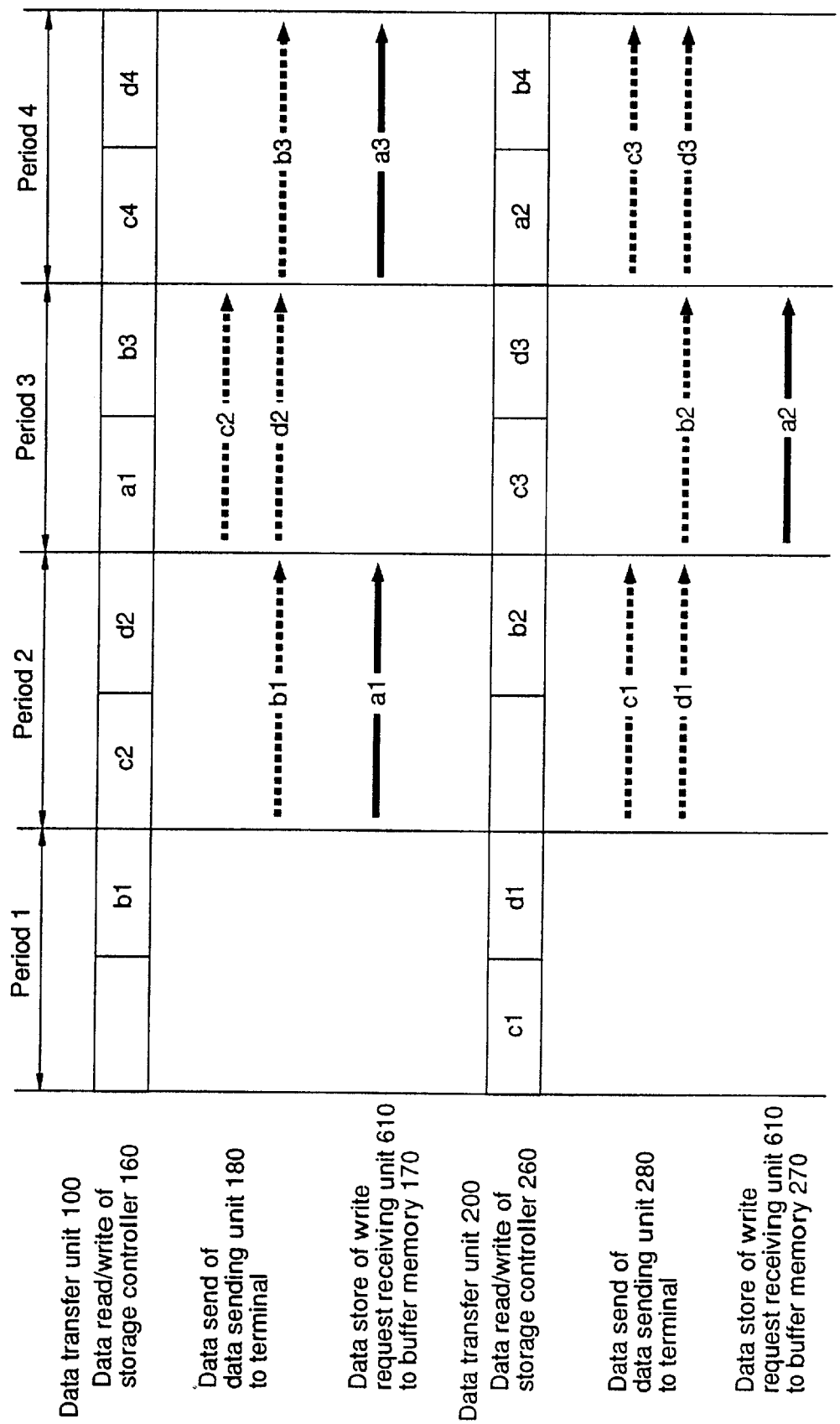
FIG. 15 is a time chart of the prior art data transfer system when the terminal 510 requires writing "256 KB" data of the file A while the terminals 520 to 540 each require reading "256 KB" data of the respective files B, C and D in a cycle.
Figure 16:
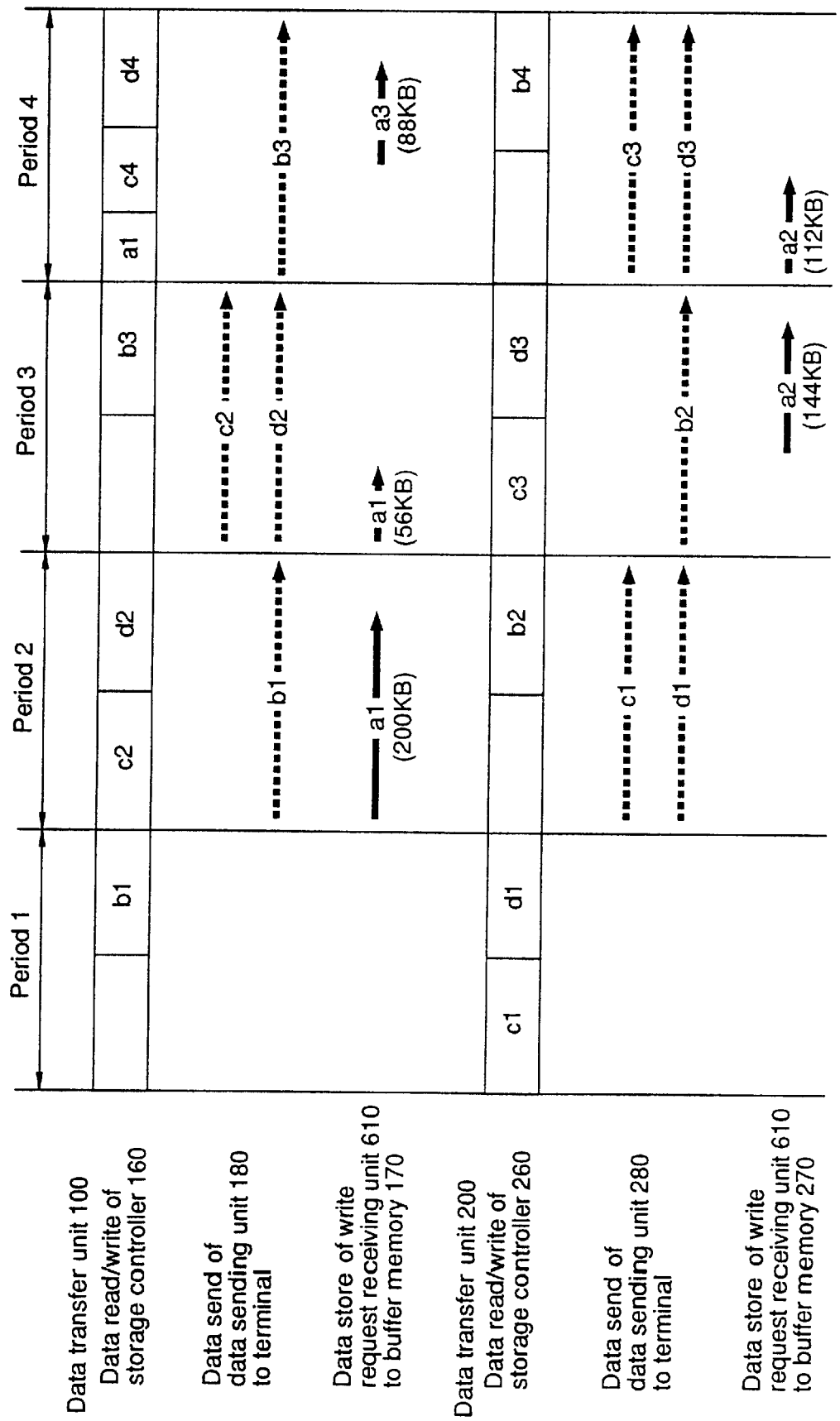
FIG. 16 is a time chart of the prior art data transfer system when the request-to-write-data of the terminal 510 for the file A has a different rate.

FIG. 10 is a block diagram of a data transfer system according to a fifth embodiment of this invention.

Referring to FIG. 10, the features of the data transfer system according to the fifth embodiment of this invention are described as follows; the data transfer system includes a write request controller 63 which receives request-to-write-datas from the terminals 51 to 54, and thereafter divides the received requests into a plurality of request-to-write-datas, the number of which corresponds to the number of the data transfer units 10 and 20, to transfer the divided request-to-write-datas to the data transfer units 10 and 20; and the data transfer system also includes data receiving units 19 and 29 which receives the transferred request-to-write-datas in the data transfer units 10 and 20 which are transferred by the write request controller 63, and thereafter stores the received data in buffer memories 17 and 27. The other configuration is the same as that of the first embodiment.

The processing for request-to-write-data is explained as follows.

The write request controller 63 receives request-to-write-data from the terminal 51, and thereafter divides the request-to-write-data into two segments to convert into two request-to-write-datas, and then send the two request-to-write-datas to the respective data receiving units 19 and 29. Thereafter, the data receiving units 19 and 29 each receive the divided request-to-write-datas to store the divided request-to-write-datas in the respective buffer memories 17 and 27. The storage controllers 16 and 26 write the data, which are stored in the buffer memories 17 and 27, into the virtual groups 91 and 92 of storages, respectively.

As described above, in the fifth embodiment, the data transfer system includes the write request controller 63 which receives request-to-write-datas from the terminals 51 to 54, and thereafter divides the received request-to-write-datas into a plurality of request-to-write-datas, the number of which corresponds to the number of the data transfer units 10 and 20, to transfer the divided request-to-write-datas to the data transfer units 10 and 20, and includes the data receiving units 19 and 29 which receives the request-to-write-datas in the data transfer units 10 and 20, which are transferred by the write request controller 63, and thereafter stores the received data in the buffer memories 17 and 27, whereby the write request controller 63 converts the request-to-writes from the terminals 51 to 54 into request-to-writes to the data transfer units 10 and 20, and thereafter sends the requests to the respective data transfer units 10 and 20. Therefore, the process for the request-to-writes can be distributed into the data transfer units 10 and 20. As a result, it can be avoided that the load of data write and data read more than can be processed is concentrated on either of the virtual groups 91 and 92 of storages of the data transfer units 10 and 20.

It should be noted that this invention is not limited within the above-described embodiments; for example, in the first and second embodiments, "256 KB" data, which a terminal requires reading or writing in a cycle, is divided into two "128 KB" which are processed by the two data transfer units; however, the data can be processed in a way that the size of the data which a terminal requires to read or write in a time can be divided by the number of the data transfer units. Specifically, when the protocol of NFS (Network File System) Version 2 is employed for request to read data, the two data transfer units each can send 4 KB data while the terminal normally requires 8 KB data for one request-to-read-data. Accordingly, the load of sending data to the terminal for one request-to-read-data is distributed into the data transfer units, whereby the object of this invention can be sufficiently accomplished.

Further, although the data transfer system which includes two data transfer units is described in the first to fifth embodiments, the number of the data transfer units is not limited to two, but any number equal to or larger than two of the data transfer units can be employed.

Furthermore, although the data transfer system which includes separately the read request receiving unit and the write request receiving unit is described in the second to fourth embodiments, both the units can be combined into one read and write request receiving unit which can be employed in the data transfer system.

Still further, although the data transfer system which includes separately the data receiving unit and the data sending unit is described in the fifth embodiment, both the units can be combined into one data receiving and sending unit which can be employed in the data transfer system.

Other changes in design and modifications are within the scope of this invention.

What is claimed is:

1. A data transfer system comprising:

a plurality of data transfer paths comprising a group of storages including a plurality of storages for storing data, an accumulating unit for temporarily accumulating said data to be transferred which are stored in said storages, a storing unit for reading out said data to be transferred stored in said storages to store said data to be transferred in said accumulating unit, and a transferring unit for transferring said data to be transferred stored in said accumulating unit to terminals, thereby dividing a file into a plurality of blocks having a given size to distribute said blocks into said plural storages on said different data transfer paths for storing said blocks, receiving request-to-reads from said terminals connected to ends of said data transfer paths by read request receiving units to properly read said data out of said storages and thereafter to transfer said data into said terminals;

a plurality of virtual groups of storages comprising storages which are those selected from said storages on said different data transfer paths; and data transfer controller for, at the first period, reading said distributed data, which are stored in a given virtual group of storages among said plural virtual groups of storage, from said storages on said plural data transfer paths all at once, to store said read data in said accumulating unit, and then at the second period, reading said distributed data, which are stored in a virtual group of storages different from said given virtual group of storages, from said storages on said plural data transfer paths all at once, to store said read data in said accumulating unit, and thus successively changing said virtual groups of storages to read data therefrom by alternating said first period and said second period.

2. The date transfer system of claim 1 which includes a write request receiving unit for receiving data of request-to-writes from said terminal to divide said received data into a plurality of data blocks the number of which corresponds to the number of said plural data transfer paths and then to write said divided data into said respective storages constituting said virtual group of storages, said write request receiving unit, at the first period, writing data into storages constituting a given virtual group of storages among said plural virtual groups of storages, and then at the second period, writing data into storages constituting a virtual group of storages different from said given virtual group of storages; and which includes a data write changing unit for successively changing said virtual groups of storages to write data therein by alternating said first period and said second period.

3. The data transfer system of claim 2 which includes a plurality of said write request receiving units and said data transfer controller including a designating unit for designating, in advance, which of said plural write request receiving units receives and processes data of request-to-writes from which terminal.

4. The data transfer system of claim 2 which includes a plurality of said write request receiving units and a write request controller for receiving request-to-write-datas from said terminals to calculate the load rates of processing request-to-write-datas which is being processed by said respective write request receiving units, and according to said calculated result, transferring said request-to-writes to said write request receiving unit having the lowest load rate.

5. The data transfer system of claim 1 which includes a write request controller for receiving request-to-write-data from a terminal to divide said received request-to-write-data into a plurality of request-to-write-datas the number of which corresponds to the number of said data transfer paths, and then transferring said divided request-to-write-datas to said respective data transfer paths, and which includes received data storing units, which are set up on said respective data transfer paths, for receiving said request-to-write-datas transferred from said write request controller to store said received data in said accumulating unit.

* * * * *